(No Model.)

J. PLAYER.
PACKING FOR STUFFING BOXES.

No. 284,756. Patented Sept. 11, 1883.

Witnesses:
H. A. Stoltenberg
D. S. Devin

Inventor:
John Player,
By Thomas G. Orwig, Atty.

UNITED STATES PATENT OFFICE.

JOHN PLAYER, OF MARSHALLTOWN, IOWA.

PACKING FOR STUFFING-BOXES.

SPECIFICATION forming part of Letters Patent No. 284,756, dated September 11, 1883.

Application filed July 12, 1883. (No model.)

*To all whom it may concern:*

Be it known that I, JOHN PLAYER, of Marshalltown, in the county of Marshall and State of Iowa, have invented an Improved Metallic Packing for Piston-Rods and Valve-Stems, of which the following is a specification.

The object of my invention is to reduce the minimum of the friction, wear, and cost of the packing required in the stuffing-boxes of all kinds of engines and pumps by providing a detachable, jointed, and flexible metallic packing that can be placed in a stuffing-box and around a rod to produce a steam-tight joint and to adjust itself relative to any irregularity that may occur in the rectilinear joint movements of a piston and its rod, and by such automatic adjustment prevent the undue friction and wear of machinery and packing incident to pistons and rods deviating from a straight line in their reciprocating motions.

My improvement consists in the combination of two small cone-shaped soft-metal rings, two cup-shaped hard-metal rings, and one plain-faced hard-metal ring with a stuffing-box, an adjustable gland, and a reciprocating piston-rod or valve-stem in such a manner that only the surface of the bores in the soft-metal rings will come in contact with the moving rod or stem and constantly retained in contact therewith at two separate points by the hard-metal rings in such a manner that the complete packing can be readily adjusted to compensate for the wear of the soft-metal portion thereof, and also in such a manner that the soft-metal rings can be readily replaced by new ones when too much worn and the hard-metal rings retained in making repairs, all as hereinafter fully set forth.

Figure 1:
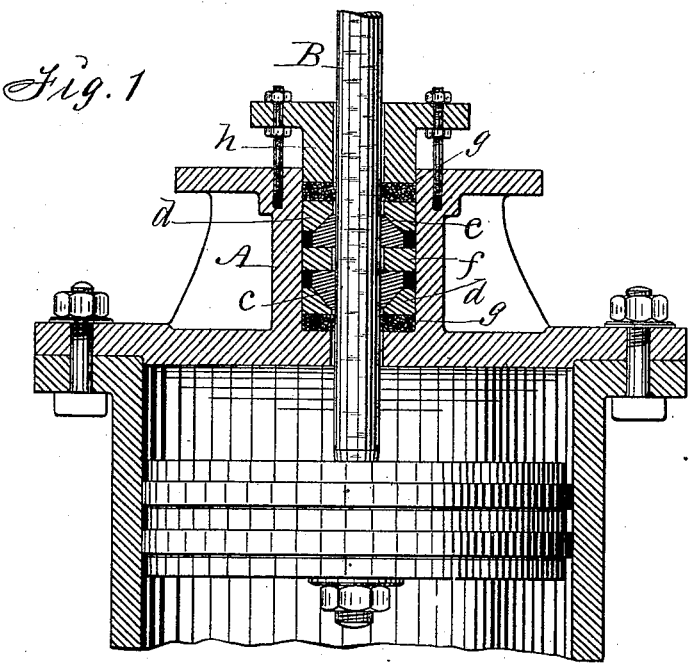
Figure 2:
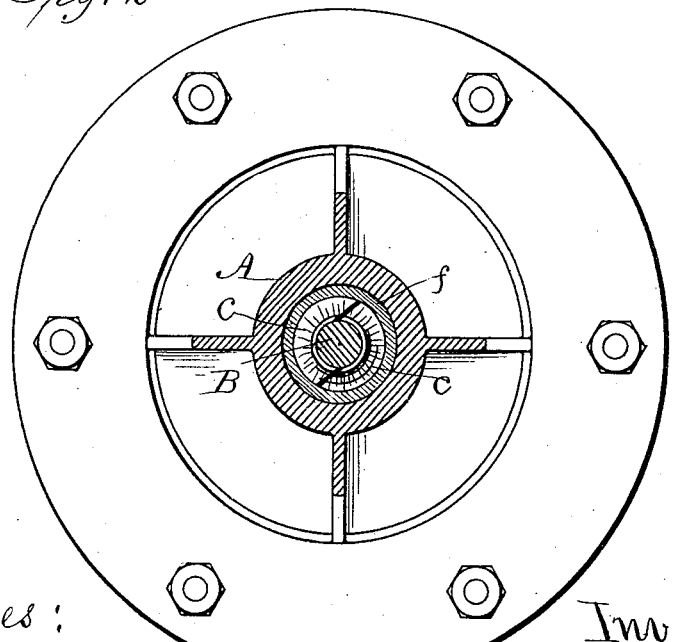

Figure 1 of my accompanying drawings is a section of a steam-cylinder, showing a longitudinal half-section of my jointed and flexible metallic packing in the stuffing-box. Fig. 2 is an end view of the cylinder, showing a transverse section of the stuffing-box removed and one of the cone-shaped soft-metal rings in contact with the piston-rod. Jointly considered, these figures clearly illustrate the construction and operation of my complete invention.

A represents a stuffing-box formed integrally with the cylinder-head.

B is a piston-rod or valve-stem.

*c c* are cone-shaped soft-metal rings, preferably made of equal parts of lead and tin. They are uniform in shape and size and severed at one or more points by inclined cuts. Their diameters are less than the bore of the stuffing-box, and their bores correspond in size with the rod which they surround and engage.

*d d* are cup-shaped hard-metal rings, preferably brass. Their peripheries fit against the wall of the stuffing-box and their bores are about one thirty-second part larger than the rod which they are designed to surround but not engage.

*f* is a plain-faced hard-metal ring, corresponding in diameter and bore and material with the cup-shaped rings *d*.

*g g* are rubber or other suitable elastic rings, placed against the flat sides of the cup-shaped rings *d*, whenever desired. *h* is an adjustable gland.

In applying my packing for practical use I simply place one of the cup-shaped hard-metal rings *d* on the solid bottom of the stuffing-box, or upon an elastic ring, *g*, with its concave or cup on the upper side. I next place one of the soft-metal and severed cone-shaped rings *c* in the box with its convex side downward to fit into the concave or cup of the ring *d*. I next place the plain-faced ring *f* upon the flat top side of the soft-metal ring *c* and the flat side of the second soft-metal ring upon top of the ring *f*. The two soft-metal rings are thus separated and protected, so that they cannot be mashed together. I then place the second cup-shaped ring *d* upon the upper ring *c* in an inverted position, so that each of the cone-shaped soft-metal rings *c* will be partially inclosed in the hard-metal rings *d*, and their shapes preserved thereby, as they are gradually worn and diminished by pressure and friction.

The gland *h* may be placed directly on the top of the flat face of the upper hard-metal ring, or an elastic ring, *g*, may intervene, as shown in Fig. 1. The enlarged bores of the hard-metal rings, that prevent them from coming in contact with the reciprocating rod, also facilitate the ingress of the oil to the surface of the soft-metal rings that are subjected to friction and wear, so that lubrication may be readily maintained to aid in reducing friction and wear and expense in packing stuffing-boxes.

From the foregoing detailed description of the construction and function of each element the unitary actions of all the parts and the practical operation and utility of my complete invention will be obvious to all persons familiar with the art to which it pertains.

I claim as my invention—

1. The detachable, jointed, and flexible metallic packing composed of two cone-shaped soft-metal rings, two cup-shaped hard-metal rings, and one plain-faced hard-metal ring, in combination with a stuffing-box, an adjustable gland, and a piston-rod or valve-stem, to operate in the manner set forth, for the purposes specified.

2. The cone-shaped soft-metal rings $c\ c$, the cup-shaped hard-metal rings $d\ d$, the plain-faced hard-metal ring $f$, the elastic rings $g\ g$, arranged and combined relative to each other, and a stuffing-box, an adjustable gland, and a reciprocating rod or stem, substantially as shown and described, for the purposes specified.

JOHN PLAYER.

Witnesses:
T. BINFORD,
W. E. SNELLING.